United States Patent
Pei

(10) Patent No.: US 8,955,420 B2
(45) Date of Patent: Feb. 17, 2015

(54) GLASS CUTTING MACHINE

(75) Inventor: Shao-Kai Pei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 303 days.

(21) Appl. No.: 13/527,870

(22) Filed: Jun. 20, 2012

(65) Prior Publication Data

US 2013/0160624 A1 Jun. 27, 2013

(30) Foreign Application Priority Data

Dec. 27, 2011 (TW) ................................ 100448900

(51) Int. Cl.
 *C03B 33/02* (2006.01)
(52) U.S. Cl.
 USPC .......................................... 83/733; 83/467.1
(58) Field of Classification Search
 USPC .................................... 83/733, 467.1–468.94
 See application file for complete search history.

(56) References Cited

U.S. PATENT DOCUMENTS

| | | | | |
|---|---|---|---|---|
| 4,024,783 A | * | 5/1977 | Sturgis | ............................ 83/468 |
| 5,373,835 A | * | 12/1994 | Pourtau | ...................... 125/23.01 |
| 5,904,084 A | * | 5/1999 | Weston | ............................ 83/373 |
| 6,530,302 B1 | * | 3/2003 | Rogers | ............................ 83/452 |
| 7,472,636 B2 | * | 1/2009 | Bavelloni | ......................... 83/879 |
| 2012/0312229 A1 | * | 12/2012 | Pei | .................................. 118/56 |
| 2013/0012109 A1 | * | 1/2013 | Pei | ................................. 451/67 |
| 2013/0104761 A1 | * | 5/2013 | Pei | ................................ 101/324 |

* cited by examiner

*Primary Examiner* — Stephen Choi
(74) *Attorney, Agent, or Firm* — Novak Druce Connolly Bove + Quigg LLP

(57) ABSTRACT

A glass cutting machine includes a worktable, a cutting mechanism positioned above the worktable, and a plurality of grasping assemblies rotatably positioned on the worktable for transporting glass plates. Each grasping assembly includes a support shaft rotatably received in the worktable, a positioning bar fixed to an end of the support shaft, and one or more grasping members positioned on the positioning bar. The worktable includes several rotating members, and each rotating member includes a support disc that can be rotated to drive the glass plate to rotate.

12 Claims, 4 Drawing Sheets

GLASS CUTTING MACHINE

BACKGROUND

1. Technical Field

The present disclosure generally relates to glass cutting machines, and particularly, to a glass cutting machine capable of automatically transporting glass plates.

2. Description of the Related Art

A glass cutting machine includes a worktable and a cutting mechanism positioned above the worktable. In use, a glass substrate is positioned on the worktable, and then the cutting mechanism separates or dices the glass substrate. After the glass substrate is machined, the glass substrate is taken out of the worktable, and another glass substrate is positioned on the worktable. However, the glass substrate is generally moved by hand, and thus the glass substrate is easily dirtied or smudged. In addition, the machined glass substrate has a sharp edge, and thus, an operator can easily sustain cuts from the glass substrate.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
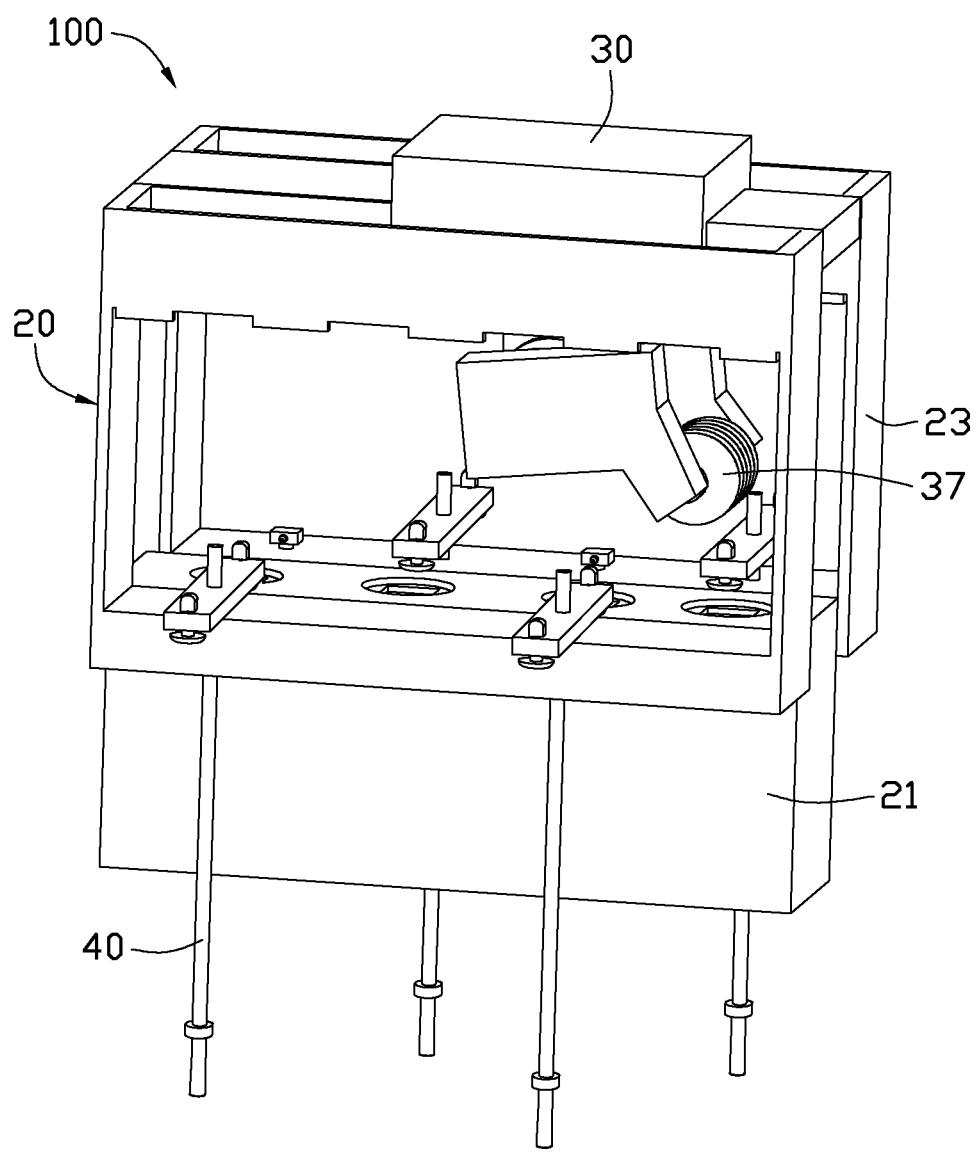
FIG. 1 is an isometric, assembled view of a first embodiment of a glass cutting machine including a plurality of grasping assemblies.
Figure 2:
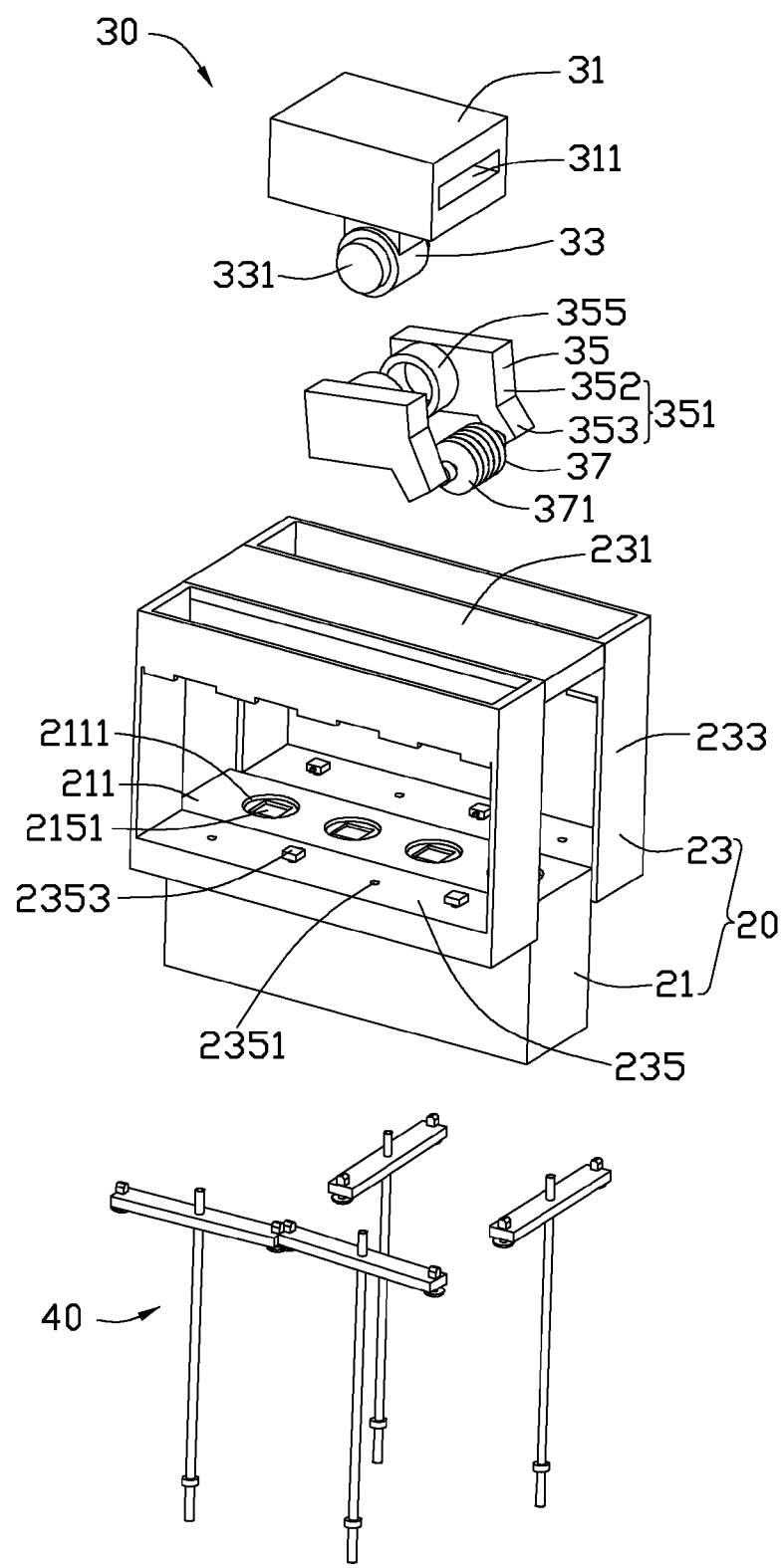
FIG. 2 is an isometric, exploded view of the glass cutting machine of FIG. 1.

Referring to FIGS. 1 and 2, an embodiment of a glass cutting machine 100 includes a worktable 20, a cutting mechanism 30, and a plurality of grasping assemblies 40. The cutting mechanism 30 is movably positioned above the worktable 20. The grasping assemblies 40 are rotatably connected to opposite sides of the worktable 20. The grasping assemblies 40 are used for feeding glass plates (not shown) on the worktable 20.

Figure 3:
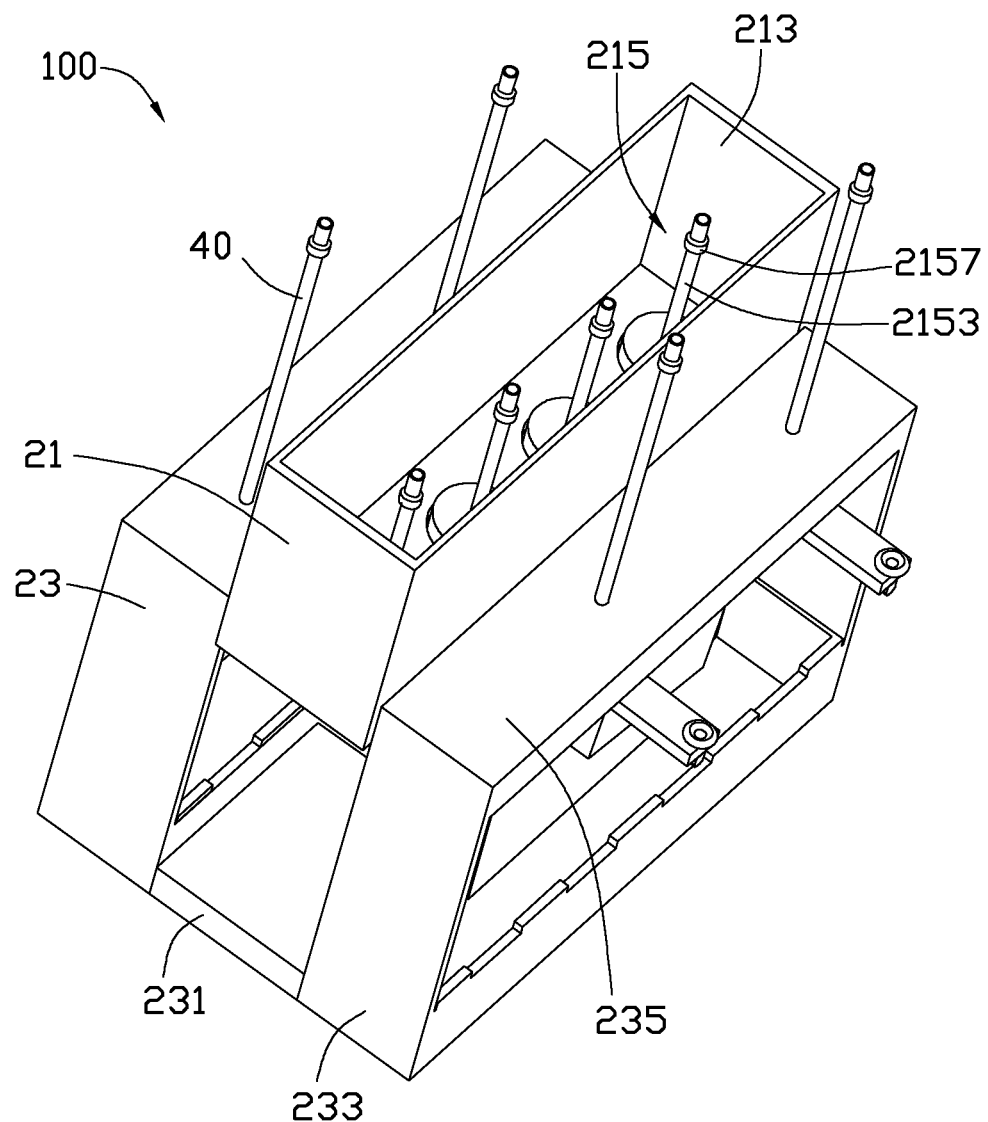
FIG. 3 is similar to FIG. 1, but viewed from another aspect.

The worktable 20 includes a base 21 and a support frame 23 positioned on opposite sides of the base 21. Referring to FIG. 3, in an illustrated embodiment, the base 21 is substantially rectangular, and includes a support surface 211, a receiving groove 213 defined under the support surface 211, and a plurality of rotating members 215. The support surface 211 defines a plurality of positioning holes 2111 communicating with the receiving groove 213. The positioning holes 2111 are substantially circular.

The rotating members 215 extend through the support surface 211, and are partially received in the receiving groove 213. Each rotating member 215 includes a support disc 2151 and a rotating shaft 2153 fixed to the support disc 2151. In the illustrated embodiment, the support disc 2151 is circular and rotatably received in the positioning holes 2111 of the base 21.

The base further includes a first driving mechanism (not shown). A first gear 2157 is positioned on an end of the rotating shaft 2153 away from the support disc 2151. The first driving mechanism drives the rotating shafts 2153 and the support discs 2151 to rotate via the first gears 2157. As a result, the glass plate positioned on the support discs 2151 is driven to rotate by the first driving mechanism via the support discs 2151.

The support frame 23 includes a guiding plate 231, four side plates 233, and two assembly plates 235. The guiding plate 231 is substantially rectangular, and the side plates 233 substantially perpendicularly connect to the four corners of the guiding plate 231. The assembly plates 235 are parallel to the guiding plate 231, and each assembly plate 235 connects two side plates 233 opposite to each other.

The assembly plate 235 defines a plurality of assembly holes 2351. In the illustrated embodiment, each assembly plate 235 defines two assembly holes 2351, and each assembly hole 2351 is aligned with one positioning hole 2111. The grasping assemblies 40 are rotatably received in the assembly holes 2351. A plurality of sprayers 2353 are mounted on the assembly plate 235. When the glass plate is being cut while resting on the support surface 211, the sprayers 2353 can spray liquid on the glass plate to cool the glass plate, and wash glass fragments and chippings away from the glass plate.

Referring to FIG. 2, the cutting mechanism 30 includes a sliding member 31, a connecting rod 33 fixed to the sliding member 31, a tool holder 35 rotatably connected to the connecting rod 33, and a cutting tool 37 rotatably connected to the tool holder 35. In the illustrated embodiment, the sliding member 31 is rectangular, and defines a sliding groove 311 for slidably positioning the sliding member 31 on the guiding plate 231. The connecting rod 33 is fixed to a bottom surface of the sliding member 31, and forms a connecting shaft 331 at a bottom end thereof away from the sliding member 31.

The tool holder 35 includes two support plates 351 opposite to each other. Each support plate 351 includes a main body 352 and a connecting portion 353 extending from the main body 352. The main body 352 forms a receiving tube 355 for rotatably receiving the connecting shaft 331. The cutting tool 37 is rotatably positioned on the connecting portions 353 of the tool holder 35. The cutting tool 37 includes a plurality of cutting blades 371.

The cutting mechanism 30 further comprises a second driving mechanism (not shown) for driving the sliding member 31 to slide on the guiding plate 231, such that the cutting tool 37 slides along the guiding plate 231. The second driving mechanism can also drive the tool holder 35 to rotate relative to the sliding member 31.

Figure 4:
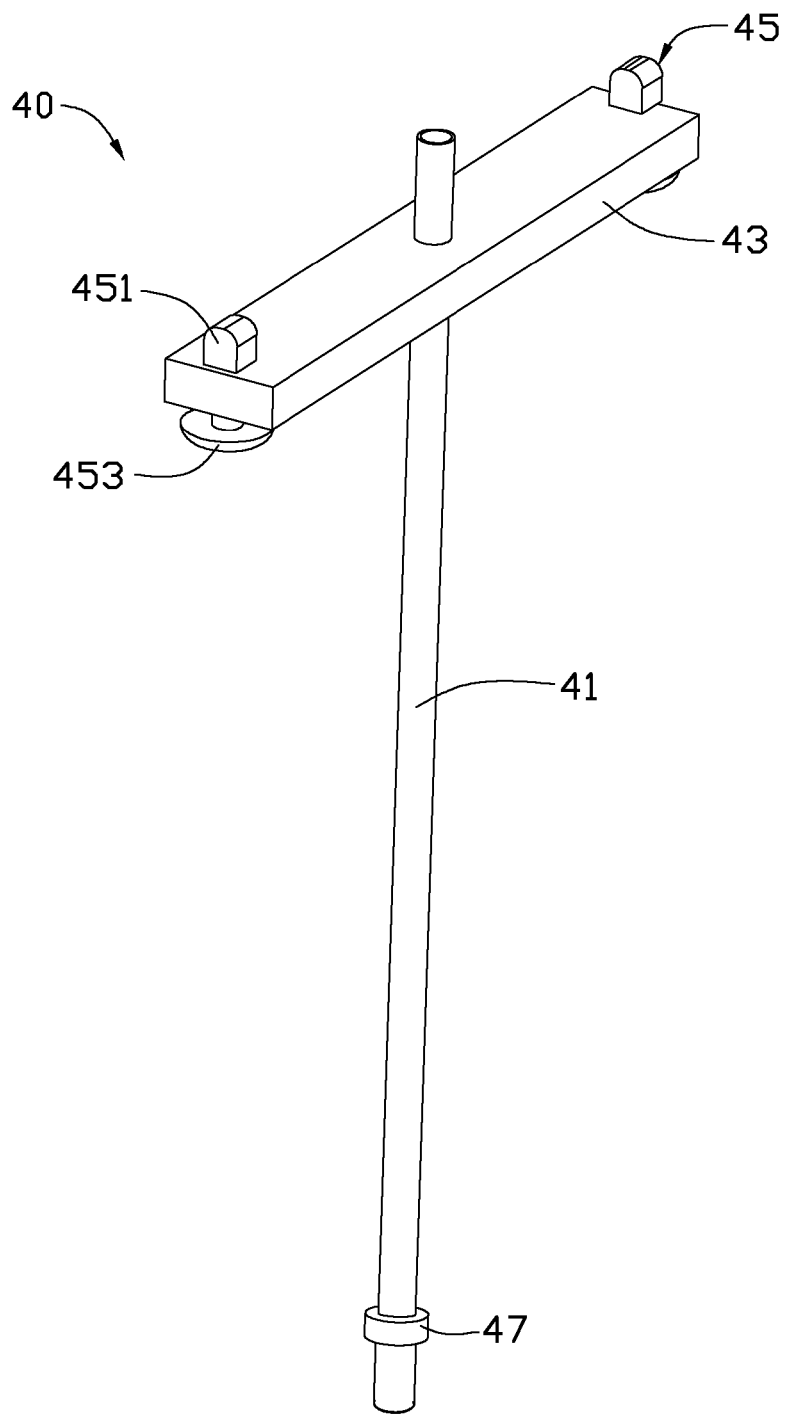
FIG. 4 is an isometric view of one of the grasping assemblies of FIG. 1.

Referring to FIG. 4, each grasping assembly 40 includes a support shaft 41, a positioning bar 43 fixed to an end of the support shaft 41, and two grasping members 45 positioned on opposite ends of the positioning bar 43. The support shaft 41 is rotatably received in the assembly holes 2351, and the positioning bar 43 is positioned above the assembly plate 235.

Each grasping member 45 includes a driving member 451 positioned in the positioning bar 43, and a suction disc 453 connected to the driving member 451. The driving member 451 drives the suction disc 453 to move towards or away from the positioning bar 43.

The grasping assembly 40 further includes a third driving mechanism (not shown). A second gear 47 is positioned on an end of the support shaft 41 away from the positioning bar 43. The third driving mechanism drives the support shaft 41 to rotate via the second gear 47, such that the positioning bar 43 is rotated.

In use, the grasping assembly 40 takes hold of the glass plate via the suction discs 453, and then the support shaft 41 is rotated to position the glass plate above the support disc 2151 of the base 21. The suction discs 453 release the glass plate, and the glass plate is positioned on the support disc 2151. After that, the support shaft 41 is further rotated to make the positioning bar 43 to be positioned out of the support disc 2151. The tool holder 35 is rotated until the cutting tool 37 resists the glass plate. The sliding member 31 slides along the guiding plate 231, such that the cutting tool 37 separates or cuts the glass plate into a plurality of glass plate pieces (not shown). After the glass plate is separated, diced, or cut into the separated glass plate pieces, the tool holder 35 is rotated to make the cutting tool 37 to move away from the glass plate, and then, the support shaft 41 is rotated to make the suction discs 453 take hold of the separated or cut glass plate pieces. The support shaft 41 is further rotated, and the separated or cut glass plate pieces are taken out of the glass cutting machine 100.

The glass cutting machine 100 transports the glass plate pieces via the grasping assembly 40, thus there is no need to move the separated/cut glass plate pieces by hand. Therefore, injuries to the operator are thereby avoided. In addition, in a cutting process of the glass plate, the support discs 2151 can be rotated to drive the glass plate to rotate, therefore, the glass plate can be separated into a number of separated glass plate pieces having different shapes, such as triangular. In alternative embodiments, the cutting mechanism 30 may be directly positioned on the worktable 20, and the glass cutting machine 100 may be assembled with a plurality of cutting mechanisms 30. The glass cutting machine 100 may have only one grasping assembly 40 for transporting the glass plate.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A glass cutting machine for cutting at least one glass plate, comprising:
   a worktable, the worktable comprising a base and a support frame mounted on the base and positioned on both sides of the base; the base comprising a support surface, a receiving groove defined under the support surface, and a plurality of rotating members, the rotating members being extended through the support surface, and being partially received in the receiving groove; the support surface defining a plurality of positioning holes communicating with the receiving groove; each of the rotating members comprising a support disc and a rotating shaft fixed to the support disc, and the support disc being rotatably received in the positioning holes of the base, the support frame comprising a guiding plate, four side plates, and two assembly plates; the guiding plate being substantially rectangular, and the side plates substantially perpendicularly connecting to the four corners of the guiding plate; the assembly plates being parallel to the guiding plate, and each assembly plate connecting two of the four side plates opposite to each other; the assembly plates being fixed to opposite sides of the base;
   a cutting mechanism slidably positioned on the support frame; and
   at least one grasping assembly,
   wherein the at least one grasping assembly is rotatably positioned on the worktable for transporting the glass plate.

2. The glass cutting machine of claim 1, wherein the cutting mechanism comprises a sliding member slidably sleeved on the guiding plate.

3. The glass cutting machine of claim 1, wherein the cutting mechanism further comprises a connecting rod fixed to the sliding member, a tool holder rotatably connected to the connecting rod, and a cutting tool rotatably connected to the tool holder.

4. The glass cutting machine of claim 1, wherein each assembly plate defines a plurality of assembly holes, and each of the assembly hole is aligned with one positioning hole; the at least one grasping assembly is rotatably received in the assembly holes.

5. The glass cutting machine of claim 1, wherein a plurality of sprayers are positioned on the assembly plate.

6. The glass cutting machine of claim 1, wherein each of the at least one grasping assembly comprises a support shaft, a positioning bar fixed to an end of the support shaft, and two grasping members positioned on opposite ends of the positioning bar; the support shaft is rotatably received in the worktable.

7. The glass cutting machine of claim 6, wherein each grasping member comprises a driving member positioned in the positioning bar and a suction disc connected to the driving member.

8. A glass cutting machine, comprising:
   a worktable the worktable comprising a base and a support frame mounted on the base and positioned on both sides of the base; the base comprising a support surface, a receiving groove defined under the support surface, and a plurality of rotating members; the rotating members being extended through the support surface, and being partially received in the receiving groove; the support surface defining a plurality of positioning holes communicating with the receiving groove; each of the rotating members comprising a support disc and a rotating shaft fixed to the support disc, and the support disc being rotatably received in the positioning holes of the base; the support frame comprising a guiding plate, four side plates, and two assembly plates; the guiding plate being substantially rectangular, and the side plates substantially perpendicularly connecting to the four corners of the guiding plate; the assembly plates being parallel to the guiding plate, and each assembly plate connecting two of the four side plates opposite to each other; the assembly plates being fixed to opposite sides of the base;
   a cutting mechanism slidably positioned on the support frame; and
   at least one grasping assembly rotatably positioned on the worktable, wherein the at least one grasping assembly comprises a support shaft rotatably received in the worktable, a positioning bar fixed to an end of the support shaft, and at least one grasping member positioned on the positioning bar.

9. The glass cutting machine of claim 8, wherein the cutting mechanism comprises a sliding member slidably sleeved on the guiding plate.

10. The glass cutting machine of claim 8, wherein the cutting mechanism further comprises a connecting rod fixed to the sliding member, a tool holder rotatably connected to the connecting rod, and a cutting tool rotatably connected to the tool holder.

11. The glass cutting machine of claim 8, wherein each assembly plate defines a plurality of assembly holes, and each of the assembly hole is aligned with one positioning hole; the at least one grasping assembly is rotatably received in the assembly holes.

12. The glass cutting machine of claim 8, wherein the grasping member comprises a driving member positioned in the positioning bar and a suction disc connected to the driving member.

* * * * *